US011801958B2

United States Patent
Hart et al.

(10) Patent No.: US 11,801,958 B2
(45) Date of Patent: Oct. 31, 2023

(54) TAMPER EVIDENT PACKAGING AND METHODS OF MANUFACTURING THE SAME UTILIZING A NON-CONTACT SEALING DEVICE

(71) Applicant: Kwik Lok Corporation, Yakima, WA (US)

(72) Inventors: Roger Keith Hart, Cowiche, WA (US); Jose Victor Mora, Jr., Zillah, WA (US)

(73) Assignee: Kwik Lok Corporation, Yakima, WA (US)

( * ) Notice: Subject to any disclaimer, the term of this patent is extended or adjusted under 35 U.S.C. 154(b) by 59 days.

(21) Appl. No.: 17/285,216

(22) PCT Filed: Nov. 7, 2019

(86) PCT No.: PCT/US2019/060336
§ 371 (c)(1),
(2) Date: Apr. 14, 2021

(87) PCT Pub. No.: WO2020/097377
PCT Pub. Date: May 14, 2020

(65) Prior Publication Data
US 2021/0380297 A1    Dec. 9, 2021

Related U.S. Application Data

(60) Provisional application No. 62/757,530, filed on Nov. 8, 2018.

(51) Int. Cl.
*B65B 51/10*      (2006.01)
*B65B 25/16*      (2006.01)
(Continued)

(52) U.S. Cl.
CPC .............. *B65B 51/10* (2013.01); *B65B 25/16* (2013.01); *B65B 43/465* (2013.01);
(Continued)

(58) Field of Classification Search
CPC ....... B65B 51/10; B65B 51/046; B65B 25/16; B65B 43/465; B65B 57/005; B65B 57/08
(Continued)

(56) References Cited

U.S. PATENT DOCUMENTS 3,997,385 A * 12/1976 Osborne ............. B29C 65/1445
156/497
4,005,563 A *  2/1977 Nitsch ..................... B65B 51/08
53/138.8

(Continued)

FOREIGN PATENT DOCUMENTS

| CN | 105473459 A | 4/2016 |
|----|-------------|--------|
| CN | 106023789 A | 10/2016 |
| EP | 1 364 883 A2 | 5/2003 |

OTHER PUBLICATIONS

Yue, Xiaolin, "Laser Optics Technology and Applications," Jiangxi Science and Technology Press, Dec. 31, 2014 (14 pages).
(Continued)

*Primary Examiner* — Dariush Seif
(74) *Attorney, Agent, or Firm* — Seed IP Law Group LLP (57) ABSTRACT

A system for manufacturing tamper evident packaging, for example a bag with a tamper evident seal, includes a noncontact sealing device, a manufacturing conveyor, and in some implementations, a tensioning device and a closure device. The manufacturing conveyor conveys the bag to opposing pairs of in-feed belts of the non-contact sealing device, wherein the belts hold opposing sides of the bag together and a laser with an outlet positioned between a first pair of the belts spot welds the bag along a specified line to fuse the opposing sides of the bag together proximate an opening of the bag. In implementations including the tensioning device and the closure device, the tensioning device draws the opposing sides of the bag together prior to the bag entering the noncontact sealing device, and the closure
(Continued)

device applies a removably coupleable closure to the bag after the bag exits the non-contact sealing device.

18 Claims, 5 Drawing Sheets

(51) Int. Cl.
  *B65B 43/46* (2006.01)
  *B65B 51/04* (2006.01)
  *B65B 57/00* (2006.01)
  *B65B 57/08* (2006.01)
(52) U.S. Cl.
  CPC .......... *B65B 51/046* (2013.01); *B65B 57/005* (2013.01); *B65B 57/08* (2013.01)
(58) Field of Classification Search
  USPC ...................................................... 53/370.7
  See application file for complete search history.

(56) References Cited

U.S. PATENT DOCUMENTS

| | | | | |
|---|---|---|---|---|
| 4,069,080 | A * | 1/1978 | Osborne | B29C 65/1635 219/121.75 |
| 4,260,447 | A * | 4/1981 | Muscariello | B65B 51/20 156/499 |
| 4,609,107 | A * | 9/1986 | Martin | B29C 66/81427 383/77 |
| 4,682,976 | A * | 7/1987 | Martin | B29C 66/81457 493/203 |
| 4,945,203 | A * | 7/1990 | Soodak | B29C 66/83413 219/121.75 |
| 4,972,953 | A | 11/1990 | Friedman et al. | |
| 4,999,969 | A * | 3/1991 | Holmes | B65B 51/043 53/138.3 |
| 5,184,447 | A * | 2/1993 | Johnsen | B29C 66/43121 53/374.3 |
| 5,600,938 | A * | 2/1997 | Trimble | B65B 51/00 53/138.4 |
| 5,882,749 | A * | 3/1999 | Jones | B65D 77/2096 428/34.8 |
| 5,993,593 | A | 11/1999 | Swartz et al. | |
| 6,207,925 | B1 * | 3/2001 | Kendall | B23K 26/067 219/121.72 |
| 6,273,607 | B1 | 8/2001 | Buchman | |
| 6,387,209 | B1 * | 5/2002 | Nettesheim | B29C 66/83513 156/499 |
| 6,524,002 | B2 | 2/2003 | Tomic | |
| 6,652,436 | B1 | 11/2003 | Yeager et al. | |
| 6,807,795 | B2 * | 10/2004 | Stoddard | B29C 66/9141 53/138.8 |
| 6,854,245 | B1 * | 2/2005 | Stoddard | B65B 51/00 53/136.5 |
| 6,874,935 | B2 | 4/2005 | Edelman et al. | |
| 6,945,017 | B1 * | 9/2005 | Bonney | B29C 66/112 53/DIG. 2 |
| 7,344,671 | B2 * | 3/2008 | Basque | B29C 66/1122 156/251 |
| 7,685,795 | B2 * | 3/2010 | King, Jr. | B29C 65/18 53/374.4 |
| 9,511,911 | B1 * | 12/2016 | Chang | B65D 33/001 |
| 10,065,770 | B2 * | 9/2018 | Howell | B65D 75/58 |
| 2002/0152722 | A1 * | 10/2002 | Stoddard | B29C 66/43121 53/133.8 |
| 2003/0041563 | A1 * | 3/2003 | Schneider | B65D 33/2516 53/412 |
| 2003/0051440 | A1 * | 3/2003 | Chow | B29C 59/007 493/227 |
| 2003/0161017 | A1 | 8/2003 | Hudson et al. | |
| 2004/0089640 | A1 * | 5/2004 | Bager | B29C 66/1122 219/121.64 |
| 2005/0109452 | A1 * | 5/2005 | Basque | B29C 66/7373 156/515 |
| 2006/0071363 | A1 * | 4/2006 | Okutsu | B29C 43/22 425/371 |
| 2007/0295445 | A1 * | 12/2007 | Maatta | B29C 65/1658 156/272.8 |
| 2008/0014389 | A1 * | 1/2008 | Wehrmann | B29C 65/7894 428/35.2 |
| 2008/0128079 | A1 * | 6/2008 | Maatta | B29C 66/1122 156/272.8 |
| 2009/0294048 | A1 * | 12/2009 | Matsuo | B29C 66/1122 156/272.8 |
| 2010/0068097 | A1 * | 3/2010 | Ade | B29C 66/81435 277/630 |
| 2012/0021883 | A1 * | 1/2012 | Callault | B29C 66/836 493/189 |
| 2012/0209111 | A1 * | 8/2012 | Cowan | A61M 5/31511 600/432 |
| 2012/0285129 | A1 * | 11/2012 | Kamigaito | B65B 51/225 53/548 |
| 2012/0311975 | A1 * | 12/2012 | Kamigaito | B29C 66/81431 53/548 |
| 2013/0102449 | A1 * | 4/2013 | Graboski | B23K 37/0235 493/340 |
| 2013/0237443 | A1 * | 9/2013 | Knebel | B01L 3/508 506/15 |
| 2013/0320019 | A1 | 12/2013 | Tinoco et al. | |
| 2014/0003743 | A1 * | 1/2014 | Luffman | B65D 33/34 493/221 |
| 2014/0140642 | A1 * | 5/2014 | Bazbaz | B29C 66/7292 53/416 |
| 2014/0228194 | A1 * | 8/2014 | Kepinski | B65B 9/04 493/227 |
| 2016/0167860 | A1 * | 6/2016 | Tomsovic | B65D 33/007 53/450 |
| 2016/0297598 | A1 * | 10/2016 | Hagino | B65D 81/3415 |
| 2017/0203531 | A1 * | 7/2017 | Ackerman | B31B 70/96 |
| 2019/0022919 | A1 * | 1/2019 | Verlaek | B29C 70/32 |
| 2021/0380297 | A1 * | 12/2021 | Hart | B29C 65/1658 |

OTHER PUBLICATIONS

Zhang, Hongtao, "Special Weld Technology," Harbin Institute of Technology Press, Aug. 31, 2013 (15 pages).

* cited by examiner

TAMPER EVIDENT PACKAGING AND METHODS OF MANUFACTURING THE SAME UTILIZING A NON-CONTACT SEALING DEVICE

BACKGROUND

Technical Field

The present disclosure generally relates to tamper evident packaging and methods for forming the same, and more specifically, to devices and methods of sealing a bag with a non-contact sealing device so as to provide a bag with a tamper evident seal.

Description of the Related Art

It is well known that tamper evident packaging is used to indicate to users that packaging has not been previously opened. As such, users opening tamper evident packaging can have confidence that the product contained in the packaging has not been removed or touched, and thus should be safe for use or consumption. Examples of tamper-evident packaging include a metal bubble-top lid, commonly known as a "safety button," which pops out of a jar lid when the pressurized seal of a jar is broken, or break-away components which cannot be re-attached after opening, including plastic seals, safety tapes, or labels. One common method of forming a tamper evident seal on a plastic bag is to use a heat sealing machine, potentially in combination with one or more adhesives, to close the bag. This is a form of a break-away tamper evident packaging, because once the seal is broken, it is obvious to a user that the packaging has been opened.

However, there are multiple issues with heat sealing technologies in use today. First, the machinery required to produce such seals is often large and bulky, requiring significant space in a production or manufacturing line, which limits its application. Second, certain machines for producing heat seals have an inefficient cycle time. In other words, known machines for producing heat sealed tamper evident packaging typically must press a heated plate or belt against the package, thus increasing the amount of time per cycle and decreasing manufacturing output. Such contact between the heating machine and the packaging presents potential for errors, including overheating, melting the packaging, or breaking the packaging, especially where the packaging to be sealed is a thin film, such as plastic bread bag. Moreover, heating machines that physically contact the packaging to produce a seal require substantial cleaning and maintenance over the life of the machine.

BRIEF SUMMARY

One or more implementations of a method for forming a tamper evident package according to the present disclosure include: sealing opposing sides of a bag together proximate a neck of the bag with a laser of a non-contact sealing device, the sealing including: holding opposing sides of the bag in proximity to each other with a first pair of belts and a second pair of belts spaced from the first pair of belts, an outlet of the laser positioned in a space between the first and second pairs of belts; and holding opposing sides of the bag in proximity to each other with moving air directed from an outlet positioned in the space between the first and second pairs of belts.

In one or more implementations, the method further includes: before sealing the bag, passing the bag through a bag tensioner, the bag tensioner including at least one bar and a pair of opposing brushes, the at least one bar and the pair of opposing brushes bringing the opposing sides of the bag in proximity prior to entering the first pair of belts and the second pair of belts of the non-contact sealing device; after sealing the bag, passing the bag through a bag tensioner, the bag tensioner including at least one bar and a pair of opposing brushes, the at least one bar and the pair of opposing brushes bringing the opposing sides of the bag in proximity; sealing the bag neck together with a non-contact sealing device includes emitting a laser light pulse to fuse the two opposing sides of the bag together; sealing the bag neck includes the laser creating a series of spaced spot welds spaced apart from each other and extending across the bag opening by repeatedly emitting intermittent light pulses; before sealing opposing sides of the bag together, detecting a presence of the bag with a sensor electrically and physically coupled to the non-contact sealing device, the sensor signaling to the laser when a bag is present for sealing; and after sealing opposing sides of a bag together, applying a closure to the neck of the bag with a closure machine.

One or more implementations of a system according to the present disclosure for manufacturing tamper evident packaging and manipulatable between an operational configuration and an inoperative configuration include: a housing; a first pair of feed belts coupled to the housing; a second pair of feed belts coupled to the housing and being spaced from the first pair of feed belts; a motor coupled to the housing, wherein when the system is in the operational configuration, the motor drives rotation of the first and second pairs of feed belts; a laser coupled to the housing with an outlet positioned in the space between the first and second pairs of feed belts; and a power supply electrically coupled to the laser.

In various implementations, the system further includes: an ultrasonic sensor coupled to the laser, wherein when the system is in the operational configuration, the sensor detects whether an item is present proximate the first and second pairs of feed belts; a control unit coupled to the housing and electrically coupled to the laser; an emergency stop coupled to the laser, the emergency stop including a button that when depressed, automatically terminates power to the laser and the motor; a manufacturing conveyer coupled to the system upstream of the housing and aligned with the first and second pairs of feed belts, wherein when the system is in the operational configuration, the manufacturing conveyer feeds a bag into the first and second pairs of feed belts, the first and second pairs of feed belts draw the bag across the outlet of the laser, and the laser emits a light pulse to seal opposing sides of the bag together proximate an opening of the bag.

In yet further implementations, the system includes: the laser repeatedly emitting intermittent light pulses to create a plurality of spot welds across a width of the bag along a designated line; a width of each spot weld being substantially equal and spaced from adjacent spot welds by a substantially equal space across the width of the bag along the designated line; the intermittent light pulses sealing the opposing sides of the bag together without contacting the bag; a centrifugal blower having an outlet located in the space between the first and second pairs of feed belts proximate the outlet of the laser, air generated by the centrifugal blower exiting the outlet to force an upper one of the opposing sides towards a lower one of the opposing sides of the bag prior to the laser emitting the light pulse; a bag tensioner located upstream or downstream from the housing relative to a path of the manufacturing conveyer, the bag tensioner including a pair of bars and a pair of brushes, wherein when the system is in the operational configuration, the pair of bars push opposing sides of the bag together and the pair of brushes apply a tension force to the bag prior to the bag entering the first and second feed belts.

In other implementations, the system further includes: a closure device located downstream from the housing relative to a path of the manufacturing conveyor, the closure device housing a plurality of closures, wherein when the system is in the operational configuration, the manufacturing conveyor conveys the bag from the first and second pairs of feed belts and into a closure of the plurality of closures; and a closure device located downstream from the housing relative to the path of the manufacturing conveyor, the closure device housing a plurality of closures connected in series, wherein when the system is in the operational configuration, the manufacturing conveyor conveys the bag from the first and second pairs of feed belts and into a closure of the plurality of closures, the closure device separating the closure from the plurality of closures.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements may be enlarged and positioned to improve drawing legibility. Further, the particular shapes of the elements as drawn, are not necessarily intended to convey any information regarding the actual shape of the particular elements, and may have been solely selected for ease of recognition in the drawings.

DETAILED DESCRIPTION

In the following description, certain specific details are set forth in order to provide a thorough understanding of various disclosed implementations. However, one skilled in the relevant art will recognize that implementations may be practiced without one or more of these specific details, or with other methods, components, materials, etc. In other instances, well-known structures associated with tamper evident packaging have not been shown or described in detail to avoid unnecessarily obscuring descriptions of the implementations. For example, while the present disclosure is generally directed to non-contact tamper evident seal manufacturing methods for plastic bags where opposing sides of the bag are welded together, it is to be appreciated that such methods can also be used with plastic packaging generally, such as for creating a break line in plastic packaging, among others.

Unless the context requires otherwise, throughout the specification and claims which follow, the word "comprise" and variations thereof, such as, "comprises" and "comprising" are to be construed in an open, inclusive sense, that is as "including, but not limited to." Further, the terms "first," "second," and similar indicators of sequence are to be construed as interchangeable unless the context clearly dictates otherwise.

Unless the context requires otherwise, the term "seal" is to be construed as "a device or substance that is used to join two things together so as to prevent them from coming apart or to prevent anything from passing between them" and may be used interchangeably with weld, fuse, bond, or splice. Similarly, unless the context requires otherwise, the term "sealing" is to be construed as "joining two things together so as to prevent them from coming apart or to prevent anything from passing between them" and may be used interchangeably with welding, fusing, bonding, or splicing.

Reference throughout this specification to "one implementation" or "an implementation" means that a particular feature, structure or characteristic described in connection with the implementation is included in at least one implementation. Thus, the appearances of the phrases "in one implementation" or "in an implementation" in various places throughout this specification are not necessarily all referring to the same implementation. Furthermore, the particular features, structures, or characteristics may be combined in any suitable manner in one or more implementations.

As used in this specification and the appended claims, the singular forms "a," "an," and "the" include plural referents unless the content clearly dictates otherwise. It should also be noted that the term "or" is generally employed in its broadest sense, that is as meaning "and/or" unless the content clearly dictates otherwise.

The present disclosure is generally directed to tamper evident packaging and manufacturing systems and methods for producing the same utilizing a non-contact sealing device. Specifically, implementations of the present disclosure include a machine for joining two opposing sides of a bag together such that a product contained within the package cannot be removed from the package.

Figure 1:
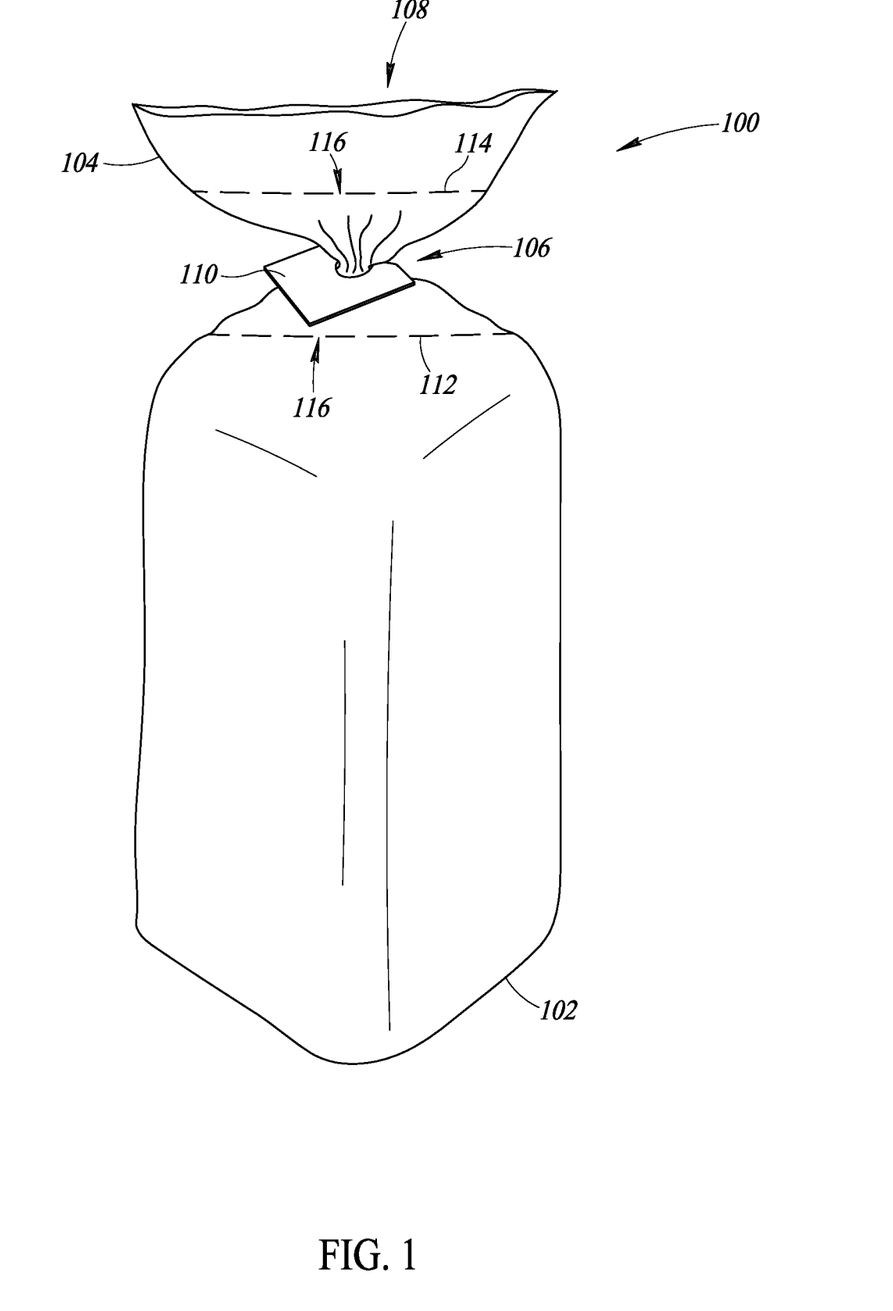
FIG. 1 is a front perspective view of an implementation of a bag formed according to the present disclosure and having a tamper evident seal proximate a neck of the bag.

For example, FIG. 1 illustrates an exemplary implementation of packaging 100, which may be a bag, for example a plastic bread bag, wherein the bag 100 includes a first, lower portion or base 102 opposite a second, upper portion or top 104 with an intermediary third portion or neck 106 spaced from the base 102 and the top 104, wherein the neck 106 is preferably closer to the top 104 than the base 102. In the illustrated embodiment, the neck 106 is proximate the top 104 of the bag 100, or in other words, the neck 106 is spaced from the top 104 by a distance of 1 inch, 2 inches, 3 inches, 4 inches, 5 inches, 6 inches, 7 inches, 8 inches, 9 inches, 10 inches or more or less than any of the above dimensions. The bag 100 includes an opening 108 at the top 104 proximate the neck 106, wherein a product (not shown), such as a loaf of bread, can be held within the bag 100 by virtue of a removably coupleable closure 110 coupled to the neck 106 of the bag 100 to hold the opening 108 in a closed condition.

The bag 100 further includes a tamper evident seal 112 or 114 proximate the neck 106 (i.e. within 5 inches, within 4 inches, within 3 inches, within 2 inches or within 1 inch of either side of the neck 106). As shown in FIG. 1, the tamper evident seal 112 or 114 can be located below the neck 106 (i.e. represented by dashed line 112), but is preferably above the neck 106 (i.e. represented by dashed line 114) relative to the opening 108; in some implementations, the bag 100 may have two tamper evident seals 112, 114, one on each side of the neck 106. It is also possible to have more than one seal on either side of the neck 106 if desired, for example, both seals 112, 114 may be located above or below the neck 106 relative to the opening 108. Each of the seals 112, 114 is preferably formed along a straight line (i.e. a line that is horizontal, as illustrated in FIG. 1) with spaces 116 between each sealing location or spot weld as described herein, although it is to be appreciated that variations in the manufacturing process may result in the seals 112, 114 formed along a curve or along a line at a slight angle to horizontal (i.e. within 10 degrees of horizontal, or more preferably within 5 degrees of horizontal, or more preferably within 3 degrees of horizontal). Although FIG. 1 illustrates the bag 100 having both seals 112, 114, the discussion will proceed with reference only to tamper evident seal 114, as it is to be understood that tamper evident seal 112 can be identical, or include some or all of the features described with reference to seal 114.

Figure 2:
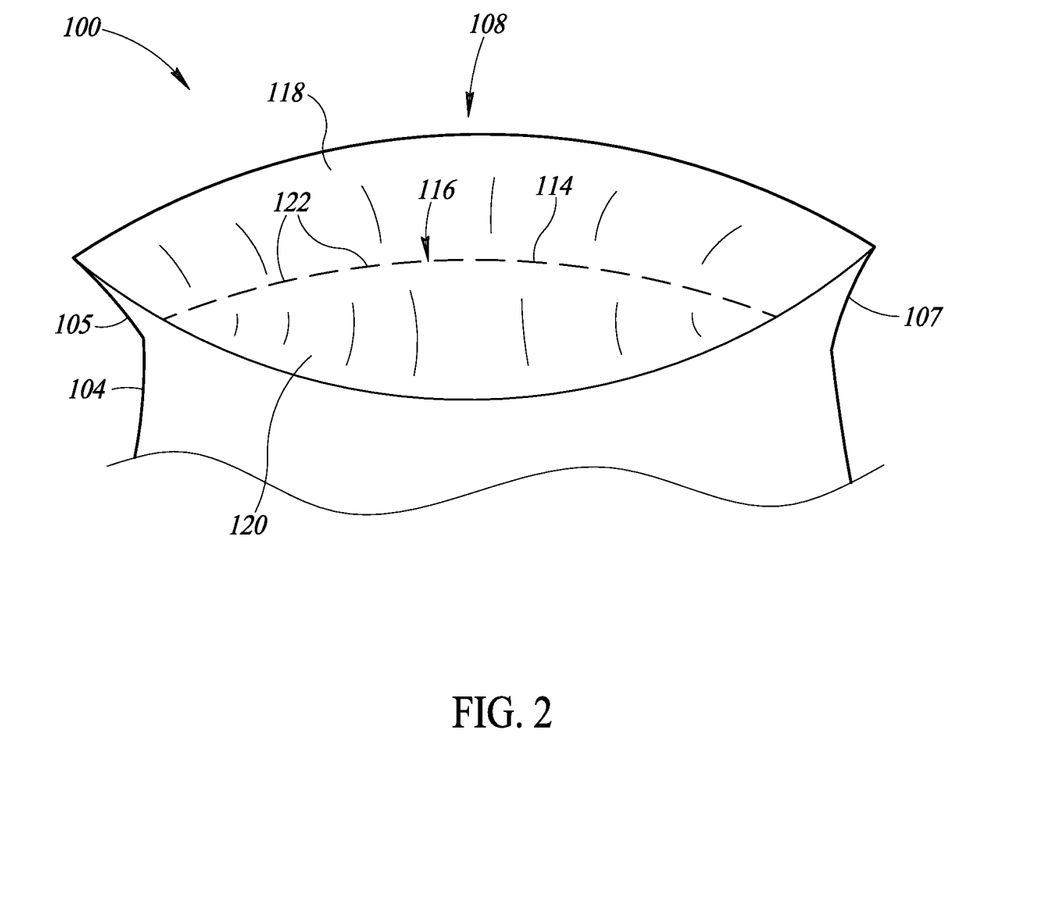
FIG. 2 is a perspective view of the bag of FIG. 1 showing opposing sides of the bag joined together by the tamper evident seal wherein the tamper evident seal consists of a series of spot welds.

FIG. 2 illustrates a perspective view looking into opening 108 at the top 104 of the bag 100 and illustrates additional detail regarding the tamper evident seal 114. The bag 100 includes opposing sides or halves 118 and 120 (i.e. first side 118 opposite second side 120) joined together by the seal 114. The seal 114 preferably includes a plurality of spot welds 122 where the sides 118, 120 of the bag 100 are joined together. As such, the spot welds 122 can also be considered coupling points or fuse locations holding the sides 118, 120 of the bag together. However, it is also to be appreciated that if desired, the seal 114 can be a single continuous line weld wherein the bag 100 is joined together across its entire width. In such implementations, there may also be a small (i.e. less than 0.1 inch) space between edges of the unitary seal 114 and edges 105, 107 of the bag 100, or no space, or a larger space, for example, a space of 0.5 inches, 1 inch, 2 inches, 3 inches, 4 inches, 5 inches or more between edges of the unitary seal 114 and edges 105, 107 of the bag 100.

In implementations where the sides 118, 120 of the bag 100 are joined together by the plurality of spot welds 122, there is similarly a plurality of spaces or gaps 116 between adjacent spot welds 122. It is preferable that each of the welds 122 are in the shape of a line or small rectangle joining material from sides 118, 120 together, which results in each of the spaces 116 having a similar rectangular shape. However, due to the nature of the manufacturing process and control of operating characteristics, other shapes are possible for the welds 122 and the spaces 116 as well. For example, each of the welds 122 may have a circular appearance (i.e. are dots of fused material), in which case, spaces or gaps 116 would have rounded edges with a concave shape defined by the circular edges of the welds 116. Of course, the welds 122 of the seal 114 may also be squares, in which case the spaces 116 would be square as well. It is to be appreciated that the spaces 116 between the welds 122 are particularly desirable to reduce pressure within the bag 100 after sealing, or in implementations where the product placed in the bag 100 prior to sealing benefits from some air entering or leaving the bag 100 via the spaces 116, such as with warm bread, for example.

In an implementation, all of the welds 122 are identical and are formed along a straight line relative to horizontal (i.e. similar to line 114 in FIG. 1). However, in other implementations, the welds may have an alternating pattern, such as one rectangular weld followed by one circular weld, or others. Further, while length and depth of each weld 122 are preferably the same or substantially the same (i.e. within 0.005 inches), it is to be appreciated that the welds 122 can each have a different length or depth in a pattern (i.e. repeated series of unique first, second, and third lengths) or there may be one weld 122 that is much longer than the others (i.e. 3, 4, 5, 6 or more times as long) surrounded by smaller welds 122. While the welds 122 are preferably formed along a line that is horizontal, in yet further implementations, the welds 122 are formed along a line that is at an angle to horizontal that is 20 degrees or more or less, 15 degrees or less, 10 degrees or less, 9 degrees or less, 8 degrees or less, 7 degrees or less, 6 degrees or less, 5 degrees or less, 4 degrees or less, 3 degrees or less, 2 degrees or less, or 1 degree or less.

In various implementations, a maximum dimension of each weld 122 is 0.0005 inches ("in"), 0.001 in, 0.002 in, 0.003 in, 0.004 in, 0.005 in, 0.006 in, 0.007 in., 0.008 in., 009 in., 0.01 in., 0.02 in, 0.03 in, 0.04 in, 0.05 in, 0.1 in., 0.2 in, 0.3 in, 0.4 in, 0.5 in, 1 in, or more. Further, a maximum dimension of each of the spaces or gaps 116 can be similar to that of any of the dimensions of the welds 122 listed above. The plurality of spot welds 122 may include more or less than 5, 10, 15, 20, 25, 30, 35, 40, 45, or 50 spot welds 122 and a corresponding number of spaces 116, wherein in an implementation, the number of spaces 116 is one greater than the number of welds 122, while in other implementations, the number of spaces 116 is one less than the number of welds 122, while in yet further implementations, the number of spaces 116 and welds 122 is equal. Accordingly, the present disclosure is not limited by the size, shape, number or orientation of the welds 122 and the spaces 116 of the seals 112, 114.

The bag 100 may be plastic and may be formed one of several ways, which will only be described briefly. For example, the bag 100 may be cut from a tube of thin (i.e. less than 0.1 in thick) plastic material (i.e. a roll of thin plastic material with a hollow center that is cut to length) and joined together by heat sealing or with adhesive, among other fastener options, proximate the base 102, such that the opening 108 remains open to maintain access to an interior (not shown) of bag 100 for holding a product (not shown). Alternatively, two opposing, parallel planar sheets of thin (i.e. less than 0.1 in thick) plastic may be fused, coupled, melted or glued together along at least three outermost edges of each sheet (i.e. align two square or rectangular sheets with each other and fuse the sheets together around 3 sides of the perimeter of the aligned combination), thus leaving the opening uncoupled so as to enable the bag 100 to receive a product (not shown) prior to forming one of the tamper evident seals 112, 114.

Figure 3:
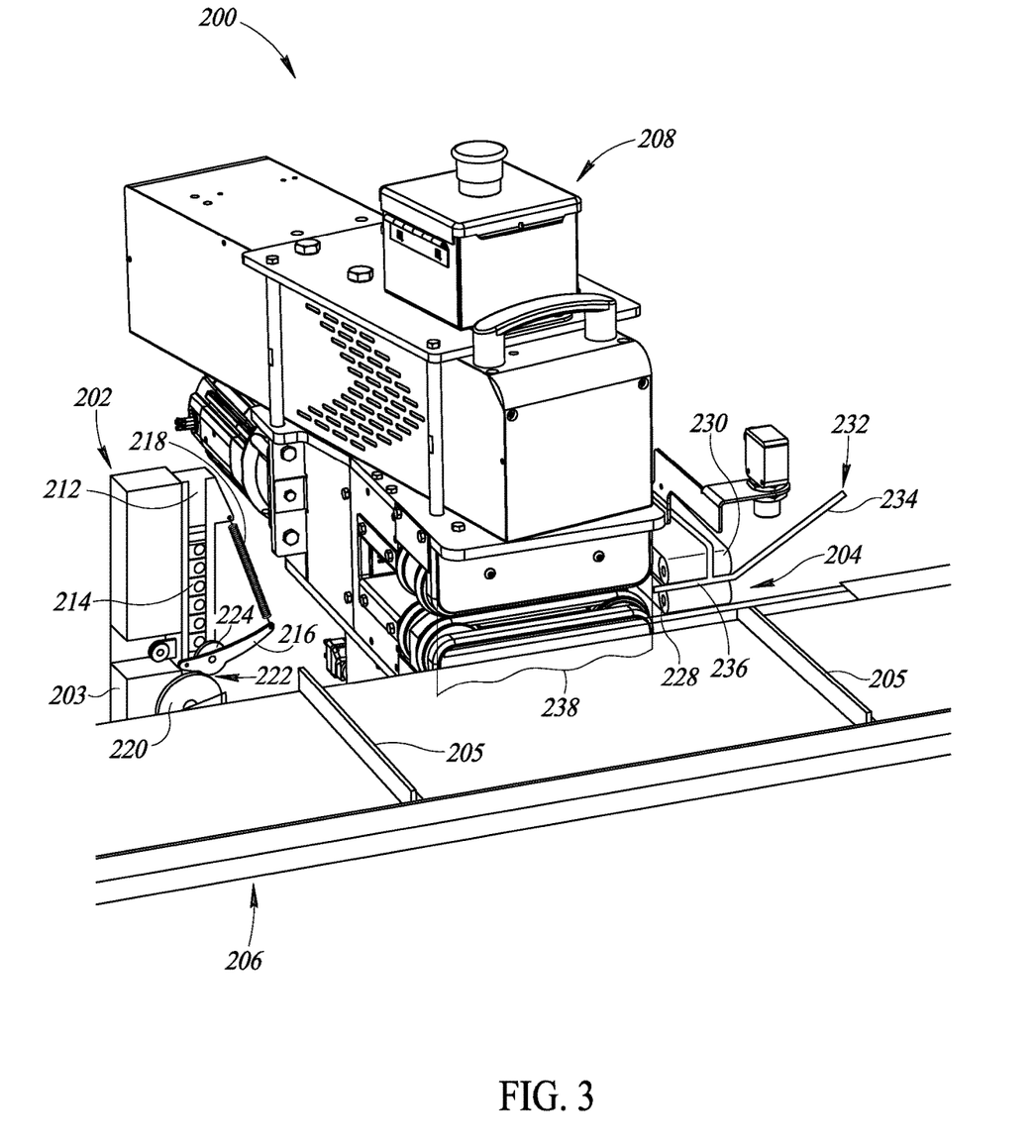
FIG. 3 is a perspective view of an implementation of a manufacturing system according to the present disclosure and utilizing a non-contact sealing device for producing a tamper evident seal.

FIG. 3 illustrates an exemplary implementation of a system 200 for manufacturing tamper evident packaging, such as bag 100. The system includes a closure machine 202, a bag tensioner 204, a manufacturing conveyor belt 206, and a non-contact sealing device 208.

The closure machine 202 includes a base 203 with a channel or track 212 coupled to the base 203 and a plurality of closures 214 in the channel 214. In an implementation, the closure machine 202 is free-standing or independent of the other machines in the system, while in other implementations, the closure machine 202 is coupled to the manufacturing conveyor 206. The closure machine 202 further includes an arm 216 coupled to the channel 212 and a spring 218 coupled to the arm 216 with a roller 220 proximate the arm 216 (i.e. below the arm 216) and a second roller 224 coupled to the arm 216.

In operation, a bag moves to the left (relative to the orientation in FIG. 3, although other configurations are possible) along the manufacturing conveyor 206, or is pushed by ridges 205 on the conveyor 206 as the conveyor moves to the left, wherein a neck of the bag is positioned to enter an entry portion 222 of the closure machine 202. The ridges 205 may also be referred to as "flights." Although FIG. 3 illustrates the manufacturing conveyor 206 having ridges or flights 205, it is to be appreciated that in certain implementations, the conveyor 206 does not have ridges or flights 205, but rather, is a smooth, flat, planar surface, in which case, the manufacturing conveyor 206 operates in a similar manner as described herein (i.e. removing ridges or flights 205 does not negatively impact the manufacturing process described herein). Rollers 220 and 224 force the neck of the bag into a cavity of a closure 214 at a bottom of the channel 212 and aligned with the entry portion 222. Spring 218 dampens forces exerted by the incoming bag on the arm 216 and otherwise keeps the arm 216 in position such that the closure machine 202 can receive additional bags in the entry portion 222 (i.e. spring 218 prevents arm 216 from blocking the entry portion 222). As the closures 214 are removed from the channel 212 and attached to bags, additional closures 214 are supplied to the channel 212 by a reel (not shown) of additional closures located above, but coupled to the closure machine 202.

It is to be appreciated that the above discussion of the closure device 202 is one exemplary implementation of a closure device and that others may be used in association with the present disclosure. For example, in other implementations of the closure device 202, the closure device 202 does not include rollers 220, 224 or arm 216 and spring 218, but rather, these parts are replaced with feed belts. Further, as described herein, the non-contact sealing device 208 can be used independently of the other devices described with reference to FIG. 3, including closure device 202, and as such, non-contact sealing device 208 can be used with other types of bag closures, such as wire tie or tape.

The bag tensioner 204 includes a pair of opposing rollers 228 for rotating a pair of opposing brushes 230. The pair of opposing brushes 230 rotate about rollers 228 in a direction that is transverse, or more preferably, perpendicular or substantially perpendicular (i.e. within 3 degrees of perpendicular) to a major planar surface of conveyor 206 (illustrated in FIG. 3). The bag tensioner 204 further includes a bar 232 including a first or upper portion 234 integrated with and extending from a second or lower portion 236. Preferably, the first portion 234 is at an angle with respect to the second portion 236. More preferably, the second portion 236 is horizontal or substantially horizontal (i.e. within 3 degrees of horizontal) and the first portion 234 is at an angle to the second portion 236 of less than 90 degrees, or more preferably, of less than 45 degrees. In an implementation, the angular orientation of the first portion 234 relative to the second portion 236 remains constant along a length of the first portion 234. Although not specifically shown, the bag tensioner 204 may further include a second bar parallel to or substantially parallel to (i.e. within 3 degrees of parallel) to the second portion 236 of bar 232 and generally parallel to a major surface of the manufacturing conveyor 206, wherein the second bar is spaced from the first bar 232. It is to be appreciated that although use of bar 232 and second bar (not shown) is preferable, use of the bars is not necessary and in some implementations, the bar 232 (and second bar (not shown)) are not present as part of the bag tensioner 204.

In operation, a bag (not shown) is pushed along conveyor 206 (to the left as shown in FIG. 3), as described herein. A top portion of the bag proximate the neck is open (i.e. opposing sides of the bag are spaced from each other), such that at least one opposing side or half of the bag comes into contact with the first portion 234 of the bar 232 and in some implementations, the second bar (not shown). The angular orientation of the first portion 234 of the bar 232 pushes the sides of the bag toward each other as the bag approaches the brushes 230. Then, because the brushes 230 rotate perpendicular to the conveyor 206 (i.e. in a direction into the page relative to FIG. 3), each of the brushes 230 contact a respective or corresponding opposing side of the bag to apply a tension force to the bag. This tension force not only brings the two sides of the bags closer together for sealing, as described herein, but also smooths and flattens the opposing sides of the bag to assist with forming an even, straight seal, as described herein. The manufacturing conveyor 206 then pulls the bag away from the bag tensioner 204 and brushes 230 and towards the non-contact sealing device 208. In other implementations, because the non-contact sealing device 208 is independent of the bag tensioner 204, as described herein, the bag tensioner 204 is not part of the manufacturing process.

The non-contact sealing device 208 will be described in additional detail with respect to FIG. 4. However, there is one feature of the non-contact sealing device 208 that is apparent from FIG. 3. As illustrated in FIG. 3, the non-contact sealing device occupies approximately 8 inches of space along the manufacturing conveyor 206. In other words, a width 238 of the non-contact sealing device 208 within the manufacturing system 200 or proximate the manufacturing conveyor 206 is approximately 8 inches (i.e. between 7 and 9 inches, but more preferably, within 7.5 inches and 8.5 inches). While it is possible for the non-contact sealing device 208 to occupy additional space as is known with larger sealing devices that employ heating belts or plates, it is preferable that the non-contact sealing device 208 occupies less space, as it allows for a more efficient and compact manufacturing process. As such, the smaller width 238 of the non-contact sealing device 208 relative to known products is an advantage that allows for a wider range of application due to its smaller, compact size.

Figure 4:
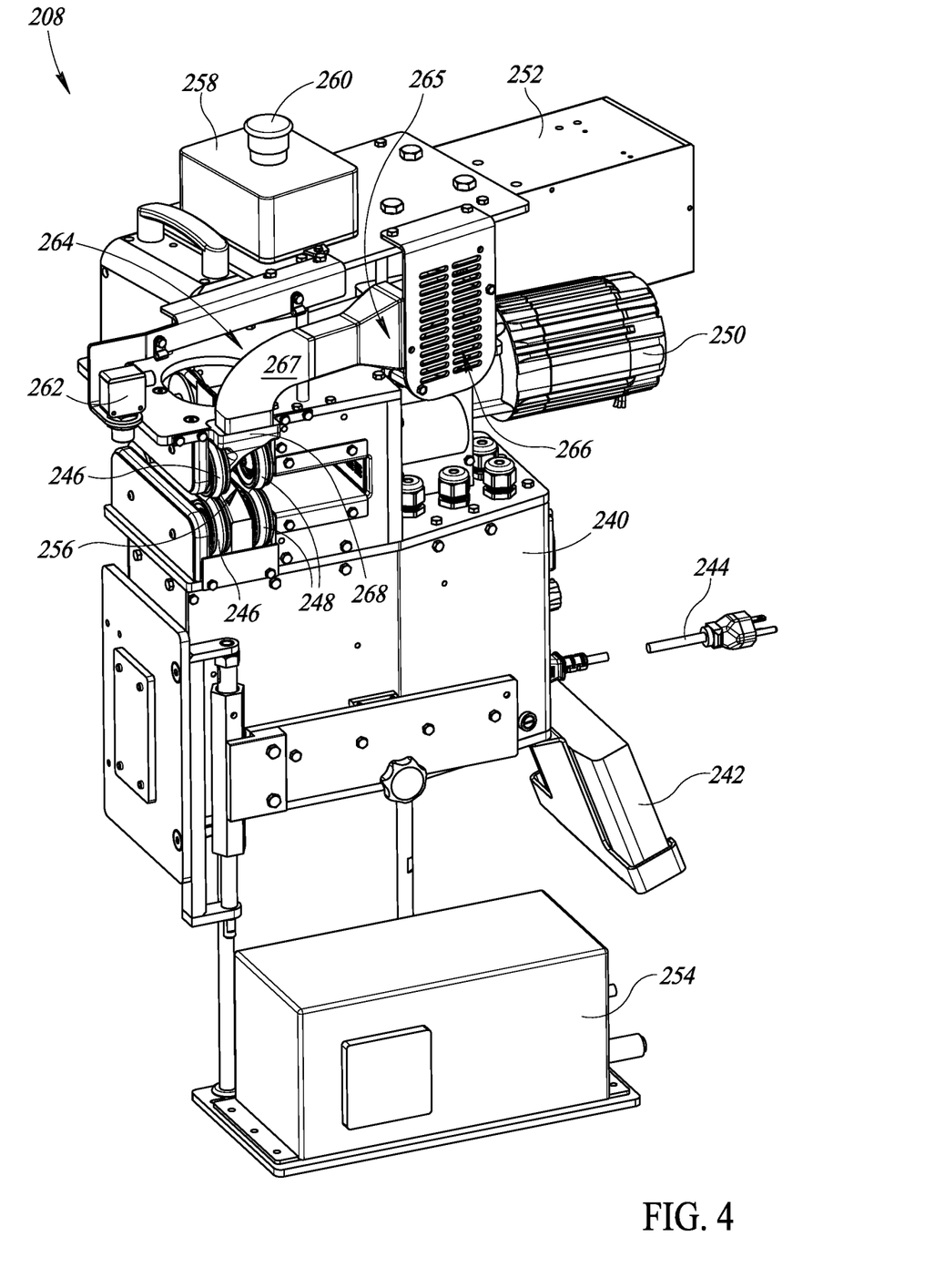
FIG. 4 is a perspective view of the non-contact sealing device of FIG. 3.

FIG. 4 illustrates the non-contact sealing device 208 in additional detail. The non-contact sealing device 208 includes a housing 240 physically and electrically coupled to a power cable 244 for connection to an auxiliary power source. As used with reference to FIG. 4 and non-contact sealing device 208, "housing" refers to the general body of the non-contact sealing device 208 illustrated in FIG. 4 to which the remaining features or components described herein are coupled or otherwise integrated into, as the case may be. The housing 240 serves as an enclosure for electrical items associated with the non-contact sealing device 208. For example, in various implementations, the housing 240 may include relays, a programmable controller, a power line communications system, power supplies, variable drives, invertors, switches, fuses or capacitors, or other such related devices. The housing 240 further serves as a support for other components of non-contact sealing device or machine 208, as described herein.

First and second pairs of feed belts 246, 248 are coupled to or otherwise integrated with the housing 240, which two pairs of belts 246, 248 may collectively be referred to as a set of belts 246, 248 or a set of opposing pairs of belts 246, 248. In an implementation, the first pair of feed belts 246 are a pair of outer opposing feed belts and the second pair of feed belts 248 are an inner pair of opposing feed belts relative to housing 240. Respective ones of each pair of feed belts 246, 248 are spaced from respective other ones of the pairs of feed belts 246, 248, as illustrated in FIG. 4 (i.e. there is an equal amount of space between each belt of the first pair of belts 246 and a similar equal amount of space between each belt of the second pair of belts 248).

Moreover, each of the first pair of feed belts 246 are spaced from each the second pair of feed belts 248 (i.e. there is an equal amount of space between each belt of the first pair of feed belts 246 and each belt of the second pair of feed belts 248), and as such, each feed belt is preferably parallel with the remaining feed belts, although in other implementations, each of the first pair of feed belts 246 are at an angle relative to one other and to each of the second pair of feed belts 248 and each of the second pair of feed belts 248 are at an angle relative to one another and each of the first pair of feed belts 246. The belts 246, 248 are driven by a motor 250, which is preferably an alternating current ("a/c") electric motor or a direct current ("DC") electric motor, which is coupled to the housing 240 and mechanically coupled to the belts 246, 248. Although not specifically illustrated, the motor 250 may include gears or belts or a drive unit for converting alternating current or direct current power into torque to rotate the pairs of feed belts 246, 248.

Although FIG. 4 illustrates the non-contact sealing device 208 having the first and second pairs of feed belts 246, 248, it is to be appreciated that in other implementations, there are more or less pairs of feed belts. For example, implementations of the present disclosure include the non-contact sealing device 208 including only one pair of feed belts or no feed belts, in which case, the conveyor 206 moves the bag 100 through the non-contact sealing device 208 as described herein, without assistance from belts. However, in other implementations, there are more than two pairs of feed belts, for example, three or four or more pairs of feed belts. Accordingly, implementations of the present disclosure are not limited by the number of pairs of feed belts.

The non-contact sealing device 208 further includes a laser 252 coupled to the housing 240 and a laser power supply 254 coupled to the housing 240 and electrically coupled to the laser 252. In an implementation, the laser power supply 254 is integrated with the laser 252 while in other implementations, the laser power supply 254 is located external to the non-contact sealing device 208 and the system 200 (i.e. is independent of laser 252 as illustrated in FIG. 4). The laser 252 may be any commercially available laser, for example, a CO2 or other gas laser, a solid-state laser, a hybrid laser, an excimer laser (i.e. a laser using a reactive gas mixed with an inert gas and electrically stimulated), a dye laser, or an array of semiconductor lasers, for example. Further, insofar as the laser 252 is characterized by the duration of laser emission, the laser 252 can be a continuous wave, single pulsed, single pulsed Q-switched, repetitively pulsed, or mode locked laser, among others. The laser 252 preferably has an outlet (not specifically shown) in a space or gap 256 between the first and second pairs of feed belts 246, 248. Preferably, the laser 252 outlet is centered with respect to the space between upper belts of the first and second pairs of feed belts 246, 248. However, it is to be appreciated that in other implementations, the laser 252 is positioned with an outlet in a space between lower ones of the first and second pairs of feed belts 246. While not specifically illustrated in FIG. 4, in some implementations, it may be possible to utilize two lasers both with an outlet in the space between upper or lower ones of the pair of belts 246, 248, or two lasers, one with an outlet in the space between upper ones of the first and second pairs of belts 246, 248 and one with an outlet between lower ones of the first and second pairs of belts 246, 248.

A centrifugal blower 266 is coupled to the housing 240 and includes an air inlet 265 and an air outlet 268 in the space 256 between the first and second pairs of feed belts 248. In other implementations, the centrifugal blower 266 is separate and distinct from the housing 240 and located exterior to the system 200. Air enters centrifugal blower 266 at inlet 265 and is accelerated by the motor, in combination with a reduction in cross sectional area of an outlet 268 relative to a transfer duct 267 of the centrifugal blower 266 extending between and connecting the inlet 265 of the centrifugal blower 266 and the outlet 268, such that velocity of air at the outlet 268 is much greater than the velocity of the air at the inlet 265. Preferably, the outlet 268 is positioned proximate to or adjacent to the outlet of the laser 252 in the space 256 between upper ones of the first and second pairs of belts 246, 248, such that air from outlet 268 forces opposing sides of the bag together for sealing by the laser 252, as described herein. Alternatively, the outlet 268 can be arranged in the space between lower ones of the first and second pairs of belts 246, 248, or two centrifugal blowers may be used (each substantially similar to centrifugal blower 266), each with an outlet in the space between each of the upper and lower ones of feed belts 246, 248, or with both outlets in the space between upper or lower ones of the pairs of feed belts 246, 248.

Further, it is to be appreciated that implementations of the present disclosure include the non-contact sealing device 208 operating without centrifugal blower 266 (i.e. centrifugal blower 266 is not part of the non-contact sealing device 208 or the system 200 generally), in which case, the opposing sides of the bag 100 to be fused together are held together only by the pairs of feed belts 246, 248.

In an implementation, the non-contact sealing device 208 includes an emergency stop switch 258 associated with laser 252, which when button 260 is depressed, will immediately terminate power to the laser 252 and the feed belt motor 250, or in other words, will force laser 252 and feed belts 246, 248 to change from an operational configuration to an inoperative configuration. In yet other implementations, the non-contact sealing device 208 includes a device 262 for detecting when an item is about to enter the feed belts 246, 248, or is in the feed belts 246, 248 or the non-contact sealing device 208 generally (i.e. in implementations without belts) as described herein. The device 262 may be an ultrasonic sensor or a position or depth sensor, although implementations of the present disclosure include the device 262 being any optical, laser, mechanical, electric, magnetic, or electromagnetic device with the purpose and function of alerting the control system of the non-contacting sealing machine 208 (such as control unit 242 or programmable controller in housing 240) to the presence of a bag (such as bag 100) present in the non-contact sealing device 208 or proximate the belts 246, 248, as described herein.

The non-contact sealing device 208 preferably includes a control unit 242 for controlling the laser 252, including characteristics such as whether the laser 252 is in the operational or inoperative configurations and a pulse direction, pattern, and style of the output of the laser 252, among others. In other implementations, the control unit 242 is integral with the laser 252, as opposed to being external as illustrated in FIG. 4. Finally, it is to be appreciated that while the non-contact sealing device 208 is preferably controlled with an external power switch (not shown) and the centrifugal blower 266 is preferably configured to operate at maximum capacity once activated to the operational configuration, control unit 242 may also be configured, in some implementations, to control various other aspects, characteristics, and conditions of the non-contact sealing device 208, for example, whether the device 208, including laser 252 and feed belts 246, 248 is in an operational configuration or an inoperative configuration, power or speed settings for the pairs of feed belts 246, 248, and power or air velocity settings for the centrifugal blower 266, among others.

As such, in operation and with reference to FIGS. 1-4, a method of forming a tamper evident seal (such as seal 112, 114) on a bag, such as bag 100, may be described as follows. The bag 100 is formed as described herein and a product is placed in the bag 100. The bag 100 is then placed on manufacturing conveyor 206 such that the base 102 of the bag is positioned away from the manufacturing system 200 and the neck 106 of the bag is positioned proximate the manufacturing system 200 or aligned with the various components of the manufacturing system 200.

The manufacturing conveyor 206 is activated, whether through control unit 242 or via a remote switch, and ridges 205 on manufacturing conveyor 206 push the bag from right to left relative to the orientation in FIG. 3. Opposing sides 118, 120 of the bag 100, which are initially spaced, contact bar 232 of the bag tensioner, such that the opposing sides 118, 120 are brought closer together. Then, the brushes 230 of the bag tensioner 204 apply tension to the bag, further bringing the opposing sides 118, 120 into proximity, or even into contact. At this point, the device 262 of the non-contact sealing device 208 senses that a bag 100 is present in the system 200 and ready for sealing and sends an activation signal to the programmable control in the housing 240, which then sends an activation signal to control unit 242 (or the laser 252 if the control unit is integral with the laser) to activate an operational configuration of the laser 252, wherein the laser begins emitting light pulses.

The conveyor 206 moves the bag 100 from the bag tensioner 204 and into the opposing pairs of feed belts 246, 248, which further flatten the bag 100 for sealing. Near an entry portion of the feed belts 246, 248, the outlet 268 of the centrifugal blower 266 further aides in pushing the opposing sides of the bags together and in some cases, in flattening the bag 100. As the bag 100 moves past the outlet of the laser 252, the plurality of non-contact spot welds 122 and spaces 116 are formed between opposing sides 118, 120 of the bag 100 by the pulses of light emitted by the laser 252, which may be single long pulses, or rapid short pulses in order to form the different spot weld 122 patterns described herein. Additionally or alternatively, the bag 100 may stop under the outlet of the laser 252 (i.e. the pair of feed belts 246, 248 and the conveyor 206 may briefly and repeatedly stop when the bag 100 is present under the outlet of the laser 252), and the spot welds 122 may be formed while the bag is still or not in motion. After the bag 100 exits the non-contact sealing device 208, the conveyor 206 conveys the bag 100 to the entry portion 222 of the closure device 202, which applies a closure 214 to the neck 106 of the bag 100, as described above.

As such, it is to be appreciated that this system is considered a "non-contact" system because the bag 100 is sealed without any physical object pressing on the bag 100. In other words, while belts 246, 248 assist in flattening the bag 100 and preparing it for sealing, the sealing is performed only by the laser 252 without use of heated plates, heated belts, or any other physical object touching the bag 100 proximate where it is to be sealed. This system and associated method of manufacturing are advantageous over known systems because of the smaller size and the reduced likelihood of unintended damage to the bag 100 by virtue of physical objects contacting the bag 100 and melting the bag 100 together. Further, this system does not require the same level of maintenance and cleaning as systems that contact the bag during sealing. It is to be further appreciated that although the bag tensioner 204 and the closure device 202 assist in the manufacturing process, that such machines or devices are not necessary in order to practice implementations of the methods described herein. Rather, such devices may assist with producing a more efficient manufacturing process wherein the non-contact sealing device 208 itself can produce a functional seal as described with reference to FIGS. 1 and 2 without assistance from the closure device 202 and the bag tensioner 204.

In one or more implementations of the present disclosure, the system 200 includes a different arrangement or order of components. For example, in FIG. 5, the system 200 includes the closure machine 202, the bag tensioner 204, the manufacturing conveyor belt 206, and the non-contact sealing device 208, as described above. However, the system 200 includes the bag tensioner 204 positioned after the sealing device 208, between the sealing device 208 and the closure machine 202. As such, as a bag travels along the conveyor 206 from the right to the left in the orientation shown in FIG. 5, the bag is first sealed by the sealing device 208, and then the bag tensioner 204 applies tension to the bag before a closure is applied with the closure machine 202. This is a different arrangement than the system 200 described with reference to FIG. 3, wherein the bag tensioner 204 applies tension to the bag first before it is sealed and a closure is applied.

Figure 5:
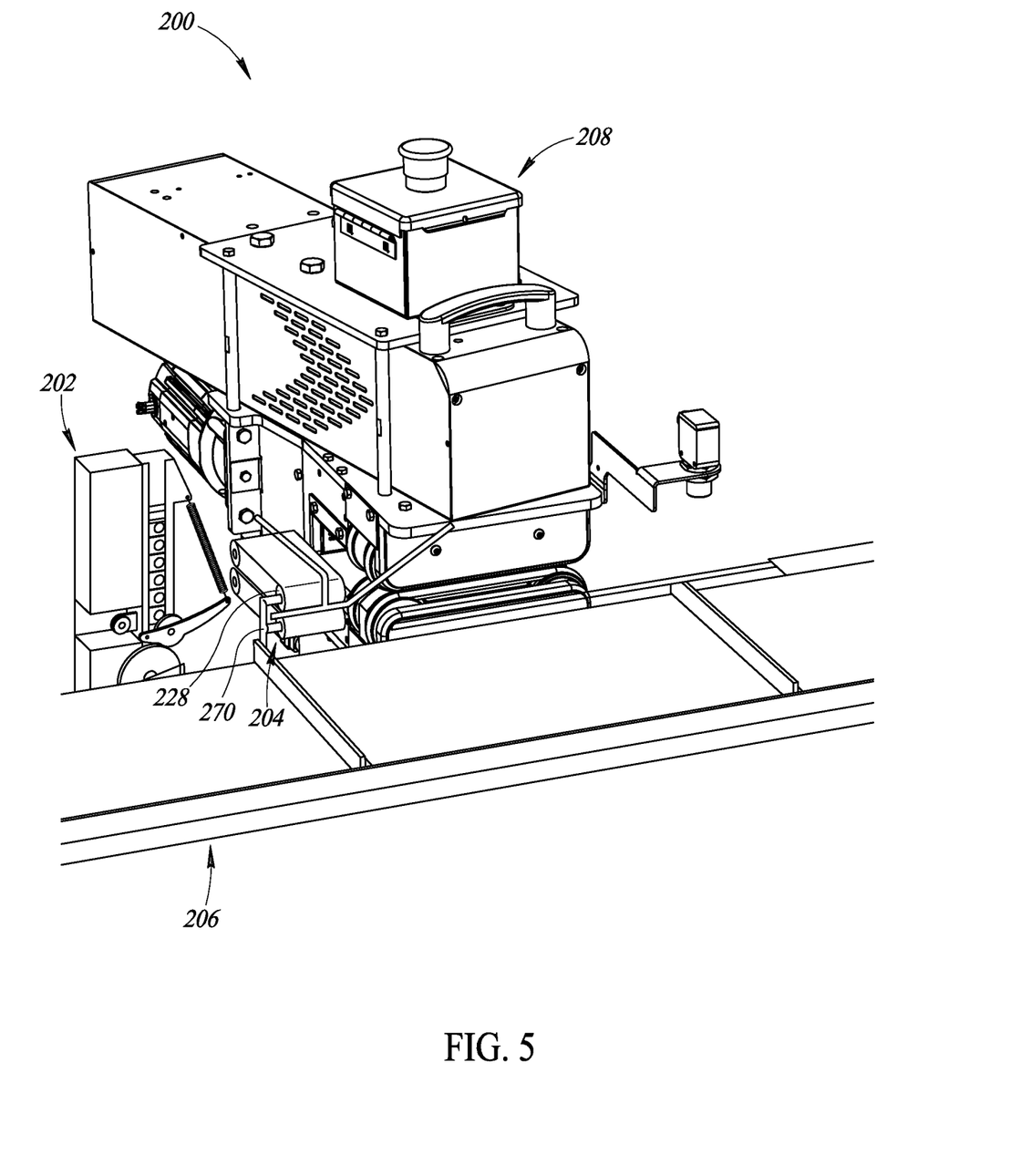
FIG. 5 is a perspective view of an implementation of a manufacturing system according to the present disclosure illustrating a non-contact sealing device for producing a tamper evident seal on a bag before the bag passes through a bag tensioner and a closure device.

The bag tensioner 204 is coupled to the sealing machine 208 and is further supported by supports 270, wherein the supports 270 include arms received in axial bores of the rollers 228 positioned proximate the conveyor belt 206, such that the rollers 228 rotate about the arms of the supports 270. The bag tensioner 204 includes a similar arrangement for the rear rollers 228, which are coupled to the sealing machine 208. Further, the sealing machine 208 may include a motor or gears configured to rotate the rear rollers 228. In other implementations, the bag tensioner 204 includes a stand-alone motor or drive system, preferably electric, configured to rotate the rollers 228 and apply tension to the bag as it passes on the conveyor 206.

As will be readily appreciated from the foregoing, the present disclosure achieves a system and a method for producing tamper evident packaging that is more efficient and occupies less space on a manufacturing line while minimizing error potential as compared to other known systems and methods. Further, implementations of the present disclosure include packaging with a tamper evident seal that prevents a product from being removed from the package. For example, the packaging may be a bread bag 100, in which case, the tamper evident seal 114 located above the closure 110 in FIG. 1 ensures that someone cannot remove slices of bread from the bread bag prior to purchase by a consumer. As such, the tamper evident seal also constitutes a safety measure against theft of a product located within the package.

The various implementations described above can be combined to provide further implementations. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the implementations can be modified, if necessary to employ concepts of the various patents, applications and publications to provide yet further implementations.

These and other changes can be made to the implementations in light of the above-detailed description. In general, in the following claims, the terms used should not be construed to limit the claims to the specific implementations disclosed in the specification and the claims, but should be construed to include all possible implementations along with the full scope of equivalents to which such claims are entitled. Accordingly, the claims are not limited by the disclosure.

The invention claimed is:

1. A system manipulatable between an operational configuration and an inoperative configuration, the system comprising:
   a manufacturing conveyor configured to convey a plurality of intermittently spaced bags placed horizontally on the manufacturing conveyor along a transport path;
   a housing arranged along the transport path;
   an outer pair of feed belts coupled to the housing, including a first upper feed belt vertically spaced from a first lower feed belt;
   an inner pair of feed belts coupled to the housing, including a second upper feed belt vertically spaced from a second lower feed belt, the inner pair of feed belts being laterally spaced from the outer pair of feed belts relative to the housing, wherein when the system is in the operational configuration, the manufacturing conveyor feeds one bag of the intermittently spaced bags into the outer and inner feed belts and the outer pair of feed belts and inner pair of feed belts simultaneously hold opposing top and bottom sides of the one bag in proximity to each other and simultaneously engage and draw the one bag across the outlet of the laser in a horizontal direction;
   a motor coupled to the housing, wherein when the system is in the operational configuration, the motor drives rotation of the outer and inner pairs of feed belts;
   a laser coupled to the housing with an outlet positioned in the space between the outer and inner pairs of feed belts and centered with respect to the first upper feed belt and the second upper feed belt, wherein when the system is in the operational configuration, the laser intermittently emits laser light pulses to fuse the opposing top and bottom sides of the bag together with a series of separate spot welds spaced apart from each other across an opening of the bag; and
   a power supply electrically coupled to the laser.

2. The system of claim 1 further comprising:
   an ultrasonic sensor coupled to the laser, wherein when the system is in the operational configuration, the sensor detects whether one bag of the plurality of intermittently spaced bags is present proximate the outer and inner pairs of feed belts.

3. The system of claim 1 further comprising:
   a control unit coupled to the housing and electrically coupled to the laser; and
   an emergency stop coupled to the laser, the emergency stop including a button that when depressed, automatically terminates power to the laser and the motor.

4. The system of claim 1, wherein the manufacturing conveyor is spaced from the outer and inner pairs of feed belts, the housing including a cavity inward of the outer and inner pairs of feed belts that receives an upper portion of the one bag.

5. The system of claim 4 further comprising:
   a bag tensioner located upstream or downstream from the housing relative to the transport path of the manufacturing conveyor, the bag tensioner including a pair of bars and a brushes, wherein when the system is in the operational configuration, the pair of bars push opposing sides of the one bag together and the pair of brushes apply a tension force to the one bag.

6. The system of claim 5 further comprising:
   a closure device located downstream from the housing relative to the transport path of the manufacturing conveyor, the closure device housing a plurality of closures connected in series, wherein when the system is in the operational configuration, the manufacturing conveyor conveys the one bag from the outer and inner pairs of feed belts and into a closure of the plurality of closures, the closure device separating the closure from the plurality of closures.

7. The system of claim 4 further comprising:
   a closure device located downstream from the housing relative to the transport path of the manufacturing conveyor, the closure device housing a plurality of closures, wherein when the system is in the operational configuration, the manufacturing conveyor conveys the one bag from the first and second pairs of feed belts and into a closure of the plurality of closures.

8. The system of claim 1 wherein the spot welds are a tamper evident seal capable of being opened without removing a portion of the bag.

9. The system of claim 1 wherein a width of each spot weld is substantially equal and is spaced from adjacent spot welds by a substantially equal space across the width of the bag along the designated line.

10. The system of claim 1 wherein the intermittent light pulses seal the opposing sides of the bag together without contacting the bag.

11. A method, comprising:
    feeding a plurality of intermittently spaced bags along a transport path with a conveyor;
    sealing opposing sides of a bag together proximate a neck of the bag with a laser of a non-contact sealing device arranged along the transport path, the sealing including:
       detecting a presence of one bag of the plurality of intermittently spaced bags proximate an inlet of the non-contact sealing device with a sensor electrically and physically coupled to the non-contact sealing device, including signaling to the laser when the one bag is present for sealing;
       holding opposing sides of the bag in proximity to each other with a first pair of belts and a second pair of belts spaced from the first pair of belts, an outlet of the laser positioned in a space between the first and second pairs of belts;
       holding opposing sides of the bag in proximity to each other with moving air directed from an outlet positioned in the space between the first and second pair of belts; and
       activating the laser in response to the signaling that the one bag is present for sealing with the sensor, including creating a series of separate spot welds spaced apart from each other and extending across the bag opening, including repeatedly emitting intermittent laser light pulses at an outlet of the laser centered with respect to upper ones of the first and second pairs of feed belts to fuse the two opposing sides of the bag together at the spot welds with the opposing sides of the bag uncoupled from each other in the spaces between the spot welds.

12. The method of claim 11 further comprising:
before sealing the bag, passing the bag through a bag tensioner arranged along the transport path upstream of the non-contact sealing device, the bag tensioner including at least one bar and a pair of opposing brushes, the at least one bar and the pair of opposing brushes bringing the opposing sides of the bag in proximity prior to entering the first pair of belts and the second pair of belts of the non-contact sealing device.

13. The method of claim 11 further comprising:
after sealing the bag, passing the bag through a bag tensioner, the bag tensioner including at least one bar and a pair of opposing brushes, the at least one bar and the pair of opposing brushes bringing the opposing sides of the bag in proximity.

14. The method of claim 11 wherein sealing the opposing sides of the bag together includes allowing air from inside the bag to pass through the spaces between the spot welds following the sealing.

15. The method of claim 11 wherein sealing the opposing sides of the bag together includes forming a tamper evident seal with the series of spot welds that is capable of being opened by a user without removing any portion of the bag.

16. The method of claim 11,
wherein the first pair of belts are an outer pair of belts and the second pair of belts are an inner pair of belts relative to a housing of the non-contact sealing device, the first pair of belts spaced vertically from each other across the inlet of the non-contact sealing device and the second pair of belts spaced vertically from each other across the inlet of the non-contact sealing device, the first pair of belts laterally spaced from the second pair of belts across the inlet of the non-contact sealing device, the outlet of the laser centered with respect to upper ones of the first pair of belts and the second pairs of belts.

17. The method of claim 11 further comprising:
after sealing opposing sides of a bag together, applying a closure to the neck of the bag with a closure machine.

18. A system, comprising:
a manufacturing conveyor configured to convey a plurality of intermittently spaced bags along a transport path;
a housing arranged along the transport path, the housing including an opening through a portion of the housing;
a sensor coupled to the housing and configured to detect a presence of one bag of the plurality of intermittently spaced bags proximate the opening;
an outer pair of feed belts coupled to the housing, including a first upper feed belt vertically spaced from a first lower feed belt across the opening of the housing;
an inner pair of feed belts coupled to the housing, including a second upper feed belt vertically spaced from a second lower feed belt across the opening of the housing, the inner pair of feed belts being laterally spaced from the outer pair of feed belts relative to the housing across a first portion of the opening, wherein when the system is in the operational configuration, the manufacturing conveyor feeds the one bag of the intermittently spaced bags into the outer and inner feed belts and the outer pair of feed belts and inner pair of feed belts hold two opposing sides of the one bag in proximity to each other and draw the one bag across the outlet of the laser;
a motor coupled to the housing, wherein when the system is in the operational configuration, the motor drives rotation of the outer and inner pairs of feed belts;
a laser coupled to the housing and in electrical communication with the sensor, the laser having an outlet positioned in the opening between the outer and inner pairs of feed belts and centered with respect to the first upper feed belt and the second upper feed belt, wherein when the system is in the operational configuration, the laser intermittently emits laser light pulses to fuse the two opposing sides of the bag together with a series of separate spot welds spaced apart from each other across an opening of the bag in response to a signal from the sensor that the one bag is present for sealing; and
a centrifugal blower having an outlet located in the opening between the outer and inner pairs of feed belts proximate the outlet of the laser, air generated by the centrifugal blower exiting the outlet of the centrifugal blower to force an upper one of the opposing sides towards a lower one of the opposing sides of the bag prior to the laser emitting the light pulse,
wherein the manufacturing conveyer is spaced from the outer and inner pairs of feed belts, and
wherein a second portion of the opening inward of the outer and inner pairs of feed belts is configured to receive an upper portion of the one bag as the outer and inner pairs of feed belts draw the one bag across the outlet of the laser.

* * * * *